United States Patent [19]

Krajewski et al.

[11] Patent Number: 4,806,574

[45] Date of Patent: Feb. 21, 1989

[54] ULTRAVIOLET CURABLE COATINGS FOR OPTICAL GLASS FIBER BASED ON A POLYFUNCTIONAL CORE

[75] Inventors: John J. Krajewski, Wheeling; Timothy E. Bishop, Algonquin; Clive J. Coady, Hanover Park; John M. Zimmerman, Schaumburg; Gerry K. Noren, Hoffman Estates; Christopher E. Fisher, LaGrange, all of Ill.

[73] Assignee: DeSoto, Inc., Des Plaines, Ill.

[21] Appl. No.: 757,249

[22] Filed: Jul. 22, 1985

[51] Int. Cl.$^4$ .......................... C08F 2/50; C08F 20/60; C08F 20/58; G02B 6/16

[52] U.S. Cl. .................. 522/96; 350/96.29; 522/97; 526/301; 526/302

[58] Field of Search ............. 522/92 VS, 97, 96; 528/75; 526/301

[56] References Cited

U.S. PATENT DOCUMENTS

| | | | |
|---|---|---|---|
| 3,864,133 | 2/1975 | Hisamatsu | 430/284 |
| 3,891,523 | 6/1975 | Hisamatsu | 525/455 |
| 4,078,118 | 3/1978 | Moyer | 522/97 |
| 4,097,439 | 6/1978 | Darling | 525/455 |
| 4,150,167 | 4/1979 | Mathias | 522/97 |
| 4,320,220 | 3/1982 | Pampouchidis | 524/555 |
| 4,458,007 | 7/1984 | Geissler | 430/284 |
| 4,472,019 | 9/1984 | Bishop | 522/92 |
| 4,485,229 | 11/1984 | Waddill | 525/504 |
| 4,495,271 | 1/1985 | Geissler | 430/277 |
| 4,608,409 | 8/1986 | Coady | 526/301 |

FOREIGN PATENT DOCUMENTS 129018  8/1983  Japan .

OTHER PUBLICATIONS

Derwent Abstract 83-756409/36, Aug. 1983, Partial Translation of Dainippon.

*Primary Examiner*—John C. Bleutge
*Assistant Examiner*—Arthur H. Koeckert
*Attorney, Agent, or Firm*—Dressler, Goldsmith, Shore, Sutker & Milnamow, Ltd.

[57] ABSTRACT

An ultraviolet curing liquid coating composition which, when cured with ultraviolet light in the presence of an appropriate photoinitiator, provides a coating adapted for the coating of optical glass fiber. This coating composition comprises as the essential component, an acrylate-terminated polyurethane oligomer based on a polyfunctional core which is at least trifunctional and which supports one branch for each functionality in the core. Each of the branches leads to an acrylate-functional terminal group, with there being from about 150 to about 2500 units of molecular weight in each branch between the trifunctional core and the acrylate-functional terminal group. Depending primarily upon the molecular weight of the branches, one can provide coating compositions for buffer coat, single coat or topcoat use.

9 Claims, No Drawings

ULTRAVIOLET CURABLE COATINGS FOR OPTICAL GLASS FIBER BASED ON A POLYFUNCTIONAL CORE

DESCRIPTION

1. Technical Field

This invention relates to ultraviolet curable coatings intended to be applied to optical glass fiber to protect the same. These coatings include topcoats as well as coatings applied directly to the glass surface of the fiber to provide low tensile modulus at the low service temperatures which may be encountered so as to resist microbending.

2. Background Art

Optical glass fiber must be coated to protect its surface against abrasion, and normal heat-cured coatings are slow curing, so it has been desired to employ ultraviolet-curing coating compositions. This proved to be quite difficult in practice because the optical fiber must be expected to encounter a wide range of service temperatures, including very low service temperatures. The usual ultraviolet-cured coatings are too hard at room temperature or become too hard when subjected to these low service temperatures. This excessive hardness causes the difference between the thermal coefficient of expansion of the coating and the thermal coefficient of expansion of the glass to produce microbends in the fiber at low temperature which interfere with the capacity of the fiber to convey optical messages.

Industry experienced great difficulty in providing ultraviolet curing coatings which would protect the glass surface against mechanical stress without inducing microbending difficulties at low service temperatures. This difficulty persisted until our coworker, R. E. Ansel in application Ser. No. 170,148 filed July 18, 1980, now U.S. Pat. No. 4,624,994, found that certain urethane oligomer diacrylates could be combined with appropriate mixtures of monoethylenically unsaturated monomers including a large proportion of a monomer of low glass transition temperature to provide a primer or buffer coating which provided reasonable resistance to low temperature microbending. The buffer-coated fiber could then be overcoated with a stronger and harder topcoat to provide the combination of properties which was needed at the different temperatures the coated fiber could be expected to encounter. However, a small proportion of a hydrogen bonding monomer was needed in the buffer coating to obtain adequate strength at room and elevated temperatures, and this led to an excessively high modulus at the lowest contemplated service temperatures.

Another problem is the desire to employ coatings of high refractive index above 1.48 when the coating is to contact the glass surface of the optical fiber. The optical fiber industry prefers to employ coatings of high refractive index because there is reason to believe the higher index of refraction will cause less attenuation in the light passing through the fiber. The coatings provided in the aforesaid Ansel application provide ultraviolet-cured coatings having the desired high refractive index, and this is an advantage of those coatings.

Unfortunately, the coatings disclosed in the aforesaid Ansel application are only able to resist temperatures down to around −40° C., and in some instances it is desired to extend the service temperature down to around −60° C.

While some ultraviolet curing coatings have been found to possess the desired low tensile modulus at low temperature required to resist microbending at −60° C., some of these possess a refractive index below 1.48, and are less desirable for this reason.

One cannot merely select very soft coatings because most of these have very poor properties at room or higher temperatures, or have poor heat stability. Optical fibers will not only encounter low service temperatures from time to time, but they will also encounter elevated service temperatures. The buffer coatings must retain some minimal strength at these elevated temperatures, and they must be stable at elevated temperature so as not to acquire greater hardness which induces microbending when low temperatures are subsequently encountered.

One object of this invention is to provide ultraviolet curing coating compositions which cure to provide buffer coatings for optical glass fibers which exhibit a combination of low tensile modulus which is maintained low at low temperature, high refractive index above 1.48, and reasonable resistance to elevated temperature combined with good stability at such elevated temperature.

Another object of this invention is to provide ultraviolet-curable coatings which combine reasonably good low temperature microbending resistance with sufficient room temperature strength to be useful in the absence of topcoating.

On the other hand, optical fibers will not only encounter low service temperatures from time to time, but they will also encounter elevated service temperatures. Those coatings which provide good low temperature characteristics are frequently much too soft at room or elevated service temperature, and thus must be topcoated. It has therefore been found to be desirable to topcoat a buffer coated optical glass fiber with a tough and flexible overcoat which possesses superior resistance to moisture and abrasion. In order to obtain the desired properties in optical glass fibers which have been buffer coated, resort has been had to the use of extruded Nylon "jacket" coatings, but these are more expensive and more difficult to apply than an ultraviolet-cured coating.

It is also known to apply both coatings at high speed using an ultraviolet-curable topcoat on top of a buffer coating which has been ultraviolet cured, but the ultraviolet-cured topcoats have not possessed the needed resistance to moisture and rupture without being inadequately flexible.

Accordingly, yet another objective of this invention is to provide ultraviolet-curable topcoatings which will duplicate, or substantially duplicate, the properties which are now obtained using the extruded "jacket" coatings noted above so that high speed coating procedures can be used to economically produce buffer coated and topcoated optical glass fiber which will satisfy the demanding commercial requirements.

Still another problem is the speed of cure. Since optical glass fibers are drawn as single filaments from a specially prepared ingot, expensive and complex apparatus may produce only one fiber at a time, so the speed of production is important. At the present time, the glass filament can be drawn with much greater rapidity than the coating can be cured by ultraviolet exposure, so maximizing the speed of the ultraviolet cure process is important. The coatings provided in the aforesaid Ansel application cure with reasonable rapidity, but the industry wants a faster cure, and that is still another objective of this invention.

DISCLOSURE OF INVENTION

In accordance with this invention, an ultraviolet curing liquid coating composition which, when cured with ultraviolet light in the presence of an appropriate photoinitiator, provides a coating appropriate for application to optical glass fiber. This coating composition comprises, as the essential component, an acrylate-terminated polyurethane oligomer which is based on a polyfunctional core. This polyfunctional core is at least trifunctional and supports one branch for each functionality in the core. Each of these branches leads to an acrylate-functional terminal group, and there are from about 150 to about 2500 units of average molecular weight in each branch between the core and the acrylate-functional terminal group.

When the molecular weight of the branches is small, e.g., from about 150 to about 700, topcoat utility is emphasized. When the branches have an average molecular weight of from about 350 to about 1500, single cost utility is emphasized. Lastly, when the average molecular weight is from about 1000 to about 2500, buffer coat utility is emphasized.

When the core is trifunctional, it is preferably selected from triamines, triols and triisocyanates. Trifunctionality is best suited for the provision of buffer coatings.

The polyurethane oligomers which are used herein are the reaction products of organic polyisocyanate with linear compounds having a plurality of isocyanate-reactive functional groups. One of these must be at least trifunctional and the remainder are difunctional in this invention. In this way, the product has a polyfunctional center or core, and the several branches emanating from this core are linear. Each branch terminates in an acrylate-functional group which may be a monoacrylate or a polyacrylate.

When the polyfunctional component is a triisocyanate, such as tris-hexamethylene isocyanate cyanurate, then it is reacted with difunctional molecules to provide the desired branch length, and then the branches are capped to provide the acrylate terminal groups. In the usual situation, the difunctional compounds provide an isocyanate-reactive functional terminal group on each branch, and then the branch ends are capped by reaction with three molar proportions of a monoisocyanate-functional acrylate. On the other hand, the branches can be made with isocyanate terminal groups, and then one can react directly with a monohydric acrylate or polyacrylate, such as 2-hydroxyethyl acrylate or pentaerythritol triacrylate. The monoisocyanate-functional acrylate is made by reacting equimolar proportions of an organic diisocyanate with a monohydric acrylate or polyacrylate, as just mentioned.

When the polyfunctional component is not a triisocyanate, such as when it is provided by a triol, like trimethylol propane, or a triamine, like tris-(2-aminoethyl) isocyanurate, then it is reacted with difunctional molecules including an organic diisocyanate to provide the desired branch length. Then, the branches are capped, as indicated previously, to provide the acrylate terminal groups. In the usual situation, the difunctional compounds provide an isocyanate-reactive functional terminal group on each branch, and then the branch ends are capped by reaction with three molar proportions of a monohydric acrylate or polyacrylate, such as 2-hydroxyethyl acrylate or pentaerythritol triacrylate. On the other hand, the branches can be made with hydroxy or amine terminal groups, and then one can react with a monoisocyanate-functional acrylate made as previously described.

Indeed, one can start with a high molecular weight triamine, such as a tris-polyoxypropylene amine-trimethylol propane ether. This triamine can then be reacted with a monoisocyanate acrylate compound to directly produce the acrylate-functional trifunctional oligomers which are preferably used herein, as will be illustrated hereinafter. In this instance, the branch molecular weight is provided directly by the number of repeating oxyalkylene groups in the triamine. These oxyalkylene groups will contain from 2-4 carbon atoms, but oxypropylene groups are preferred.

Referring more particularly to the trifunctional core materials, these may be constituted by triols, such as trimethylol propane, glycerin or the monobutyl ester of pentaerythritol. Triamines are further illustrated by diethylene triamine. Triisocyanates are further illustrated by the commercial triisocyanate having the formula:

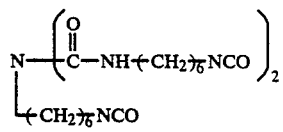

Tetrafunctional compounds which may be used to form the core are illustrated by propoxylated pentaerythritol having a molecular weight of 500.

Similarly, one can use propoxylated sorbitol to provide a polyfunctional core compound having even higher functionality.

Referring more particularly to the difunctional materials which may be used to grow the branches to the required molecular weight, typical difunctional materials are illustrated by diols, diamines, aminoalcohols, diisocyanates, and the like.

The diamines can be simple diamines, like 1,6-hexane diamine, but polyoxyalkylene diamine having a molecular weight in the range of from about 100 to about 2500 in which the alkylene group contains from 2-4 carbon atoms are preferred. These are available from Texaco Inc. Houston, Tex., under the trade designations Jeffamine D230, D400 and D2000, the number indicating the molecular weight.

The diols are illustrated by butylene glycol, 1,6-hexane diol, and oxyalkylene glycols, like polypropylene glycol. Those having a molecular weight of from about 100 to about 2500 are preferred.

Aminoalcohols are also useful, such as 6-amino-1-hexanol.

Any organic diisocyanate may be used, including those of various molecular weights up to about 2500. These are illustrated by 2,4-toluene diisocyanate, isophorone diisocyanate, 4,4'diphenylmethane diisocyanate, methylenebis (4-cyclohexyl-isocyanate), and the like.

In some instances it is preferred to use a diisocyanate in which a linear aliphatic chain containing at least 6 carbon atoms separates the two isocyanate groups. Any long chain aliphatic diisocyanate can be used, such as trimethyl hexamethylene diisocyanate or 1,12-dodecyl diisocyanate. These may be dimer fatty acid diisocyanates. Dimer fatty acids are dicarboxylic acids formed by dimerizing fatty acids which usually contain 18 carbon atoms, and this provides a 36 carbon atom dicarboxylic acid. When these two terminal carboxylic acid groups are converted to isocyanate groups, the result is a $C_{36}$ diisocyanate.

The separation of the two isocyanate groups may include other groups in addition to the long carbon chain. Thus, dimer fatty acids may be reacted with ethylene oxide to provide hydroxy ester groups, or with several moles of ethylene oxide to add ether groups, and then the hydroxy-terminated product so-provided can be reacted with excess diisocyanate to provide isocyanate terminal groups. Also, the two carboxy groups in the starting dimer fatty acid can be converted to amine groups in known fashion, and the resulting diamine can be reacted with excess diisocyanate to provide a diisocyanate which still contains the 36 carbon atoms chain which has been found to be useful herein.

The acrylate-terminated oligomers which have been described are useful alone in some instances, when the oligomer is itself liquid. In most instances the oligomer is solid or unduly viscous, in which case it is used in admixture with a liquid acrylate-functional material which does not increase the low temperature hardness and which provides the liquidity needed for coating application. This acrylate-functional liquid may be a monoacrylate monomer having a glass transition temperature below about 0° C. (preferably below −20° C.) which provides the coating composition with a viscosity suitable for coating, or it may be a linear aliphatic diacrylate in which the two acrylate groups are separated by a chain of at least 6 carbon atoms or by a molecular weight of at least 400 up to about 4000.

The glass transition temperature of the monomer is the glass transition temperature of a homopolymer of the monomer, and this is a conventional identification of the character of a monomer. Suitable low glass transition temperature monomers are illustrated by ethoxyethoxyethyl acrylate, phenoxyethyl acrylate, butoxyethyl acrylate, 2-hydroxyethyl acrylate, and the like.

Good resistance to low temperature microbending can also be introduced by including in the liquid mixture applied to the glass filament, a relatively high molecular weight liquid linear aliphatic diacrylate in which the two acrylate groups are separated by a linear chain containing at least 6 carbon atoms, or where less than 6 carbon atoms are present in the chain, that chain is part of a polyether or similar oligomer having a molecular weight of from 400 to about 4000, preferably from 600 to 2500. Polyoxyalkylene glycol diacrylates are preferred, especially polyoxybutylene glycol diacrylates having a molecular weight of from 800 to 2000. These linear diacrylates provide the needed liquidity with little increase in low temperature modulus.

Commercially available products which may be ued as the liquid linear aliphatic diacrylate component are Chemlink products 9000 and 9001, as well as Chemlink 2000.

The molecular weights herein are calculated from the reactivity of the compounds based on their theoretical formulas.

In the production of the acrylated oligomers of this invention, the acrylate-functional terminal groups may be supplied by a monohydric acrylate or polyacrylate. 2-hydroxyethyl acrylate is a preferred monohydric monoacrylate. Polyacrylates help to speed the cure at little sacrifice of low temperature softness, and are preferred for that purpose, but the oligomers of this invention are faster curing even when 2-hydroxyethyl acrylate is selected. These are illustrated by pentaerythritol triacrylate. Other monohydric polyacrylates which may be used are illustrated by glycerin diacrylate, trimethylol propane diacrylate, the dimer of pentaerythritol triacrylate having a single hydroxy group, and the diacrylate of propoxylated trimethylol propane having a molecular weight of about 355. All of these will considerably speed the ultraviolet cure, but they will not unduly increase the tensile modulus at temperatures of −40° C. down to −60° C.

In this invention it is found that the acrylate-terminated oligomers described herein, either alone or in combination with liquid reactive diluents which have been discussed, cure on ultraviolet exposure in the presence of appropriate photoinitiators, to provide soft coatings which retain low modulus down to very low temperature. Moreover, the modulus ratio an be very favorable, allowing the combination of good room temperature strength with good low temperature resistance to microbending. Modulus ratio is the ratio of the tensile modulus at −60° C. to the tensile modulus at room temperature (25° C.) and is about 580 in typical commercial compositions made in accordance with the Ansel application noted previously. In this invention, preferred compositions have a modulus ratio of less than 300, preferably less than 200. The modulus is measured in a free film having a thickness of 3 mil at 2½% elongation.

The hydrogen bonding monomers, such as N-vinyl pyrrolidone, are no longer essential, though they can be used to increase strength when it is desired to combine reasonable low temperature resistance to microbending with superior room temperature hardness enabling the usual topcoat to be eliminated. Thus, one may include, especially when the applied coating is a single coating without any topcoat, up to about 15% of a liquid monomer having a high glass transition temperature, preferably above about 55° C. These are illustrated by dimethyl acrylamide, isobornyl acrylate, acrylic acid and dicyclopentenyl acrylate, in addition to the N-vinyl pyrrolidone which is preferred for this restricted purpose. Topcoat application of the coatings of this invention are also contemplated, and when these are intended, the high glass transition temperature monomers just illustrated would be used in an amount of from about 15% to about 45%.

The ultraviolet-cured compositions of this invention normally have an index of refraction of about 1.54–1.55, and possess a tensile modulus which is far lower than was previously obtainable using the teachings of the referred to Ansel application. As a result, microbending difficulties are now avoidable down to around −60° C.

The coating compositions of this invention are intended to be cured with ultraviolet light, so photoinitiators are normally present in an amount of from 0.5% to 8%, preferably fromm 2% to 5%. These are conventional components of ultraviolet curing ethylenically unsaturated coatings, the usual photoinitiators being ketonic, such as benzophenone, acetophenone, diethoxy acetophenone, m-chloro-acetophenone, propionphenone, thioxanthone, benzoin, benzil, anthraquinone, and the like. The preferred photoinitiator is 2,2-dimethoxy 2-phenyl acetophenone which is available in commerce under the trade designation Irgacure 651. These photoinitiators are used alone or in admixture with one another, and amines, like diethyl amine, can be added as photosensitizer, though this is not normally needed.

The coating compositions of this invention are normally free of volatile organic solvents because these would have to be evaporated prior to ultraviolet exposure, which would slow the curing system.

The invention is illustrated in the following example of preferred practice.

EXAMPLE 1

To a clean dry reaction vessel charge 344.4 grams of a tris-polyoxypropylene amine-trimethylol propane ether having a molecular weight of about 5000 (Jeffamine T-5000 from Texaco Inc. Houston, Tex., may be used), 0.25 gram of dibutyl tin dilaurate and 0.25 gram of phenothiazine under a dry nitrogen atmosphere. The contents of the vessel are then stirred and heated to 50° C. There is separately premixed 76.90 grams of the monoisocyanate formed by reacting one mole of isophorone diisocyanate with one mole of 2-hydroxyethyl acrylate and 75.00 grams of phenoxyethyl acrylate, and this mixture is slowly added to the vessel over a 1½ hour period while maintaining a temperature in the range of 50° C. to 55° C. After addition is complete, the reaction mixture is maintained at temperature for a further ½ hour and then 3.20 grams of 2-hydroxyethyl acrylate are added and the temperature maintained between 55° C. and 60° C. until the NCO concentration drops to zero as indicated by infra-red analysis.

82.4 parts of the resulting polyurethane polyurea triacrylate solution so-produced is combined with 14.6 parts of butoxyethyl acrylate and 3.0 parts of 2,2-dimethoxy 2-phenyl acetophenone to form a liquid coating composition which is coated upon glass to form a film 3 mil thick which is cured by exposure to ultraviolet light using medium pressure mercury vapor lamps which supply ultraviolet light having a wavelength ranging from about 260 to about 380 nanometers. The ultraviolet dose is about 3.5 Joules/cm$^2$.

The cured films are then stripped from the glass support and tested to show a tensile strength at 25° C. of 207 psi. (the tensile modulus is 209 psi.) and an elongation of 101%. At −60° C. the tensile strength was 3693 psi. (the tensile modulus was 44,630 psi.) and the elongation was 95%. These properties are reasonably effective for buffer coat use since they avoid microbending difficulties at −60° C. while the room temperature properties provide acceptable strength. The compositions are stable at 130° F.

The modulus referred to herein is tensile modulus, and it is measured at 2½% elongation.

EXAMPLE 2

One mole of isophorone diisocyanate is reacted with one mole of 2-hydroxyethyl acrylate in the presence of 0.1% by weight of dibutyl tin dilaurate and 0.05% of phenothiazine at 25° C. to 35° C. This forms a monoisocyanate monoacrylate.

One mole of amine-terminated propoxylated glycerin having a molecular weight of 440 (by calculation from amine functionality) [Jeffamine T-403 from Texaco, Inc., Houston, TX, may be used] is reacted with 3.05 moles of the previously produced monoisocyanate monoacrylate in the presence of 4% by weight of 2-hydroxyethyl acrylate. This reaction is carried out at 25° C. to 35° C. in solution in 20% by weight, based on the weight of the solution, of phenoxyethyl acrylate. The catalyst and inhibitor used to form the monoisocyanate monoacrylate are still present.

67 parts of the above polyurethane polyacrylate oligomer solution is mixed with 30 parts of phenoxyethyl acrylate and 3.0 parts of 2,2-dimethoxy 2-phenyl acetophenone. The mixture is clear, orange-colored, and has a viscosity of 6870 centipoises. This mixture is then coated and cured as in Example 1 to provide a film having a tensile strength of 4000 psi. at 25° C. and an elongation of 22% at that temperature. The modulus at 25° C. is 127,000 psi. and the rupture strength is 1300 inch-pounds per cubic inch.

In contrast with the results reported in Example 1, a typical commercial composition in accordance with the disclosure of said application Ser. No. 170,148 coated and cured in the same way provides a film having a 25° C. strength of 500 psi, a tensile modulus of 500 psi., and an elongation of 170%. At −60° C., the tensile strength increased to 8700 psi., the modulus increased to 290,000 psi., and the elongation was only 5%. Thus, these cured coatings at −60° C. are much harder and more brittle than those obtained herein. All of these coatings have about the same desirable refractive index of about 1.54.

It should be observed that the ratio of modulus at −60° C. to modulus at room temperature has been very considerably changed. In the typical commercial composition, this ratio is 290,000 divided by 500 (about 580). In contrast, Example 1 herein provided a ratio of about 213 which is far better than the commercial control.

The coatings of this invention are applied to freshly drawn optical glass fiber having a diameter of about 125 microns in a thickness of about 125 microns and are cured by passing the coated fiber through two tandemly arranged 10 inch 300 watts medium pressure vapor lamp at 1.5 meters per second.

In further contrast with the commercial control, short exposures to ultraviolet radiation were applied to the control and to Example 1 of this application. Using 0.05 Joules per square centimeter of ultraviolet light, and then extracting the commercial control with methyl ethyl ketone, it was found that 65% of the coating weight could be extracted. With the same exposure, only 44% of the film from Example 1 of this application could be extracted, so the ultraviolet cure is more rapid. In comparison with films made using long chain diisocyanates to provide good low temperature microbending resistance, it was found that the films of this invention cured faster and better. Accordingly, the products of this invention have merit from many perspectives.

The insolubilization referred to above is measured by boiling the free film in methyl ethyl ketone solvent for 2 hours in a Sohxlet extractor to determine the weight proportion which remains undissolved by that treatment.

EXAMPLE 3

To a clean dry reaction vessel charge 410.34 grams of a tris-polyoxypropylene amine-trimethylol propane ether having a molecular weight of about 3000 (Jeffamine T-3000 from Texaco Inc. Houston, Tex., may be used), 0.30 grams of dibutyl tin dilaurate and 0.30 gram of phenothiazine under a dry nitrogen atmosphere. The contents of the vessel are then stirred and heated to 50° C. There is separately premixed 152.70 grams of the previously produced monoisocyanate monoacrylate (see Example 2) and 30.00 grams of phenoxyethyl acrylate, and this mixture is slowly added to the vessel over a 1½ hour period while maintaining a temperature in the range of 50° C. to 55° C. After addition is complete, the reaction mixture is maintained at temperature for a further ½ hour and then 6.36 grams of 2-hydroxyethyl acrylate are added and the temperature maintained between 55° C. and 60° C. until the NCO concentration drops to zero as indicated by infra-red analysis.

77.0 parts of the above product is blended with 20.0 parts of glyceryl propoxy triacrylate and 3.0 parts of 2,2-dimethoxy 2-phenyl acetophenone. The above triacrylate is the reaction product of 3 moles of propylene glycol with 1 mol of glycerin and then with 3 moles of acrylic acid.

This mixture is then coated and cured as in Example 1 to provide a film having a tensile strength of 944 psi. at 25° C. and an elongation of 38% at that temperature. The modulus at 25° C. is 6,410 psi., so the film properties at room temperature are such that overcoating can be dispensed with on optical fiber. However, at −20° C., the tensile strength is 2579 psi. and the elongation is 44% with a modulus of only 24,075 psi. Even at −40° C., the properties are still soft enough to resist microbending, namely: a tensile strength of 4,635 psi, and elongation of 20% and a modulus of only 96,971. Also, the insolubilization at an ultraviolet dose of 0.05 Joules per square centimeter was 84% of that obtained with a dose of 3.5 Joules per square centimeter.

What is claimed is:

1. A volatile solvent-free ultraviolet curing liquid coating composition which, when cured with ultraviolet light, provides a coating adapted for the buffer coating of optical glass fiber, said coating composition consisting essentially of a photoinitiator, sufficient acrylate-functional liquid having a glass transition temperature below about 0° C. to provide the liquidity needed for coating application, and an acrylate-terminated polyurethane oligomer based on a polyfunctional core, said oligomer being the reaction product of organic diisocyanate with compound having a plurality of isocyanate-reactive functional groups, a high molecular weight trifunctional triamine providing said core and to supporting one branch for each functionality in said core, and any remainder of isocyanate-reactive compound being difunctional, each of said branches leading to an acrylate-functional terminal group bound to each branch by a urethane group or a urea group, there being from about 1000 to about 2500 units of molecular weight in each branch between said core and said acrylate-functional terminal group.

2. An ultraviolet curing liquid coating composition as recited in claim 1 in which said trifunctional component is a tris-polyoxypropylene amine-trimethylol propane ether.

3. An ultraviolet curing liquid coating composition as recited in claim 1 in which said branches are terminated with monoacrylate groups.

4. An ultraviolet curing liquid coating composition as recited in claim 1 in which said branches are terminated with polyacrylate groups.

5. An ultraviolet curing liquid coating composition as recited in claim 1 in which said composition, when cured with ultraviolet light, has a ratio of the modulus at −60° C. to the modulus at 25° C. of less than 300.

6. An ultraviolet curing liquid coating composition as recited in claim 1 in which said monoacrylate monomer has a glass transition temperature below about −20° C.

7. An ultraviolet curing liquid coating composition as recited in claim 6 in which said low glass transition temperature monomer is selected from the group consisting of ethoxyethoxyethyl acrylate, phenoxyethyl acrylate, butoxyethyl acrylate, and 2-hydroxyethyl acrylate.

8. An ultraviolet curing liquid coating composition as recited in claim 1 in which said coating composition cures to provide an index of refraction is about 1.54–1.55.

9. An optical glass fiber buffer coated with an ultraviolet-cured coating of the composition of claim 1.

* * * * *